US011365664B2

(12) United States Patent
Bauer et al.

(10) Patent No.: US 11,365,664 B2
(45) Date of Patent: Jun. 21, 2022

(54) METHOD FOR CONTROLLING A REFLUX VALVE AND EXHAUST SYSTEM

(71) Applicant: Vitesco Technologies GMBH, Hannover (DE)

(72) Inventors: Peter Bauer, Bonn (DE); Michael Hamann, Nuremberg (DE); Cheikh Diouf, Silly-sur Nied (DE); Romain Jacques, Montois la Montagne (DE)

(73) Assignee: Vitesco Technologies GmBH, Regensburg (DE)

( * ) Notice: Subject to any disclaimer, the term of this patent is extended or adjusted under 35 U.S.C. 154(b) by 0 days.

(21) Appl. No.: 17/226,419

(22) Filed: Apr. 9, 2021

(65) Prior Publication Data
US 2021/0222598 A1    Jul. 22, 2021

Related U.S. Application Data

(63) Continuation of application No. PCT/EP2019/077452, filed on Oct. 10, 2019.

(30) Foreign Application Priority Data

Oct. 10, 2018 (DE) .................... 10 2018 217 305.2

(51) Int. Cl.
*F01N 3/20*     (2006.01)
*F01N 3/28*     (2006.01)
*F01N 11/00*    (2006.01)

(52) U.S. Cl.
CPC .............. *F01N 3/208* (2013.01); *F01N 3/28* (2013.01); *F01N 11/00* (2013.01); *F01N 3/2066* (2013.01);
(Continued)

(58) Field of Classification Search
CPC . F01N 3/208; F01N 3/28; F01N 11/00; F01N 2900/0422; F01N 3/2066;
(Continued)

(56) References Cited

U.S. PATENT DOCUMENTS 8,646,475 B2    2/2014    Jochumsen et al.
2011/0047972 A1  3/2011    Bauer et al.
(Continued)

FOREIGN PATENT DOCUMENTS

CN    101091040 A    12/2007
CN    102066709 A     5/2011
(Continued)

OTHER PUBLICATIONS

International Search Report and Written Opinion dated Feb. 3, 2020 from corresponding International Patent Application No. PCT/EP2019/077452.
(Continued)

*Primary Examiner* — Brandon D Lee (57) ABSTRACT

A method for controlling a return valve of an exhaust system and to an exhaust system with a control unit which is configured to carry out the method. The method is based on the object of avoiding an overpressure in the line system for urea solution as a result of a reduction in the injection rate. The method includes the steps of determining whether one or more of the following states are present during the operation of the exhaust system: a) an injection rate per unit of time of urea solution of the dosing valve is less than or equal to a predefined injection limit, b) a pressure measured by the pressure sensor in the line system overshoots a predefined first upper pressure limit (P2). The return valve is opened for a first predefined opening duration ($\Delta t1$) if states a) and b) are present and at least one of the states has already been present for at least a predefined period of time ($\Delta ta$).

(Continued)

The return valve is closed after the first predefined opening duration ($\Delta t1$) has elapsed.

11 Claims, 3 Drawing Sheets

(52) U.S. Cl.
CPC ....... *F01N 2610/02* (2013.01); *F01N 2610/11* (2013.01); *F01N 2610/1406* (2013.01); *F01N 2610/148* (2013.01); *F01N 2610/1433* (2013.01); *F01N 2610/1473* (2013.01); *F01N 2900/0422* (2013.01); *F01N 2900/1808* (2013.01)

(58) Field of Classification Search
CPC ............. F01N 2610/02; F01N 2610/11; F01N 2610/1406; F01N 2610/1433; F01N 2610/1473; F01N 2610/148; F01N 2900/1808; F01N 2900/0408; F01N 2900/0412; F01N 2610/146; F01N 2900/1812; F01N 2610/14; Y02T 10/12
See application file for complete search history.

(56) References Cited

U.S. PATENT DOCUMENTS

| | | | |
|---|---|---|---|
| 2011/0186153 A1 | 8/2011 | Vogt et al. | |
| 2014/0165539 A1* | 6/2014 | Nagata | F01N 3/10 60/286 |
| 2017/0241315 A1* | 8/2017 | Shirasawa | F01N 3/208 |
| 2018/0178162 A1* | 6/2018 | Honda | C10G 70/00 |
| 2018/0274424 A1* | 9/2018 | Monge-Bonini | F01N 13/16 |

FOREIGN PATENT DOCUMENTS

| | | |
|---|---|---|
| EP | 1656986 A1 | 5/2006 |
| EP | 2131021 A1 | 12/2009 |
| JP | 212102637 | 12/2009 |
| WO | 2017050814 A1 | 3/2017 |
| WO | 2017212015 A1 | 12/2017 |

OTHER PUBLICATIONS

Chinese office Action Dated Feb. 22, 2022 for corresponding Chinese application No. 201980066385.2.

* cited by examiner

METHOD FOR CONTROLLING A REFLUX VALVE AND EXHAUST SYSTEM

CROSS-REFERENCE TO RELATED APPLICATIONS

This application claims priority to PCT Application PCT/EP2019/077452, filed Oct. 10, 2019, which claims priority to German Patent Application No. DE 10 2018 217 305.2, filed Oct. 10, 2018. The disclosures of the above applications are incorporated herein by reference.

FIELD OF THE INVENTION

The invention relates to a method for controlling a return valve of an exhaust system, where the exhaust system includes, a catalytic converter system, a urea solution tank, at least one dosing valve for injecting urea solution into the catalytic converter system, a line system which enables urea solution to flow from the urea solution tank to the dosing valve and back, a pump arranged between the urea solution tank and the dosing valve in the line system, a return valve arranged between the dosing valve and the urea solution tank in the line system, and a pressure sensor which is configured to measure the pressure in the line system. The invention also relates to an exhaust system, which also includes a control unit which is connected in a communicating manner to the dosing valve, the pump, the return valve and the pressure sensor.

BACKGROUND OF THE INVENTION

To reduce the nitrogen oxide concentration ($NO_x$) in the exhaust gas, in particular in diesel engines, methods for exhaust-gas purification have been used and developed for many years. One established method is the use of a selective catalytic reduction catalytic converter (SCR catalytic converter) in the exhaust system. Such catalytic converters are advantageous in particular for reducing $NO_x$ emissions both in trucks and in cars and are widely used.

A common variant of the SCR catalytic converter uses a urea solution (for example AUS 32/Ad Blue©, an aqueous solution with approximately 32 wt % urea) as reducing agent, which is injected into the catalytic converter system of the vehicle. The urea solution is evaporated in the exhaust system and converted into gaseous ammonia ($NH_3$). This ammonia is converted in the SCR catalytic converter with the harmful nitrogen oxides $NO_x$ to form nitrogen $N_2$ and water $H_2O$.

For the injection of the urea solution into the SCR catalytic converter, a pump is used to force the urea solution under pressure from the urea solution tank into a line system, and a dosing valve is used to dose the pressurized urea solution into the catalytic converter system.

In the prior art, in some cases, the remaining urea solution is pumped back out of the line system when the exhaust system is shut down, in particular in order to avoid icing of the urea solution at very low temperatures. Alternatively or additionally, the urea solution tank or parts of the line system may be heated. In more recent exhaust systems with SCR catalytic converters, it is also customary for a return valve to be provided through which excess urea solution can flow from the line system back into the urea solution tank. Usually, however, this valve is kept closed during normal operation of the exhaust system and is opened only when the engine connected to the exhaust system is shut down (for example when a motor vehicle with such an exhaust system is parked).

The injection rate of urea solution through the dosing valve is usually linked to the driving state (engine speed, gear ratio, speed, exhaust-gas temperature, etc.) of the vehicle in which the exhaust system is located, and to measurements of the exhaust-gas composition by an exhaust-gas sensor downstream of the SCR catalytic converter.

During operation, the pump builds up an operating pressure (for example 5 to 10 bar) in the line system. After and during an injection process, the pressure is raised to the operating pressure such that the injection process can take place in a well-defined and uniform manner. Too high or too low a pressure during the injection can have negative effects on the exhaust-gas purification, because the urea solution is then not distributed in the desired manner or an incorrect amount of urea solution is injected.

In practice, it has been found to be problematic if a vehicle with an exhaust system mentioned in the introduction transitions rapidly from a driving state with a high injection rate, or with high engine power and exhaust-gas temperature (for example driving at high speed) to a driving state with a very low injection rate (for example a standstill situation with the engine running at a traffic signal, in a traffic jam, etc.). In this case, an operating pressure has already been built up in the line system. At the same time (at least for a short period of time), no or very little injection of urea solution takes place, and it is thus also the case that no dissipation of pressure occurs in the line system. The already pressurized urea solution that remains in the line system is heated by the heat of the engine/exhaust gas. This in turn leads to a very great increase in pressure in the line system until the "build-up" of urea solution is depleted. On the one hand, this temporarily leads to the above-described non-uniform injection behavior or to a malfunction and non-opening of the dosing valve, which worsens the exhaust-gas purification. In extreme cases, the dosing valve may even become blocked if the overpressure in the line system becomes too great. A similar problem can occur upon starting of the vehicle in the case of partial icing of the urea solution in the line system 7. The thawing of the urea solution in the line system can then also lead to a pressure increase in the presence of a low injection rate or in the absence of an injection rate.

At the same time, these (temporary) pressure peaks require highly robust, elastic and pressure-resistant urea lines (composed for example of ethylene propylene diene monomer) in the line system, which makes production more difficult and increases the costs of the system.

Although known return valves in some cases exhibit mechanical emergency opening behavior, this must occur only in the presence of a very high overpressure so as not to negatively influence the normal closing behavior of the return valve. Usually, however, this emergency opening occurs only in the presence of several times the operating pressure, when damage to the line system or to the dosing valve may already have occurred. At the same time, a return valve that opens automatically and solely on the basis of the prevailing pressure would not be expedient, because it is also possible in other driving states of the vehicle (for example in the case of very high injection rates of the urea solution) for a overpressure to briefly prevail in the line system, without an opening of the return valve being desirable in this situation. This would even have a negative impact on the injection behavior or increase the energy consumption.

SUMMARY OF THE INVENTION

It is the object, in the case of an exhaust system of the type mentioned in the introduction, to avoid damaging pressure peaks in the line system as a result of rapid changes in the driving state.

According to the invention, for the control of an exhaust system mentioned in the introduction, a method is provided which includes the following steps:
  determining whether one or more of the following states are present during the operation of the exhaust system:
    a) an injection rate per unit of time of urea solution of the dosing valve is less than or equal to a predefined injection limit,
    b) a pressure measured by the pressure sensor in the line system overshoots a predefined first upper pressure limit,
  opening the return valve for a first predefined opening duration if states a) and b) are present and at least one of the states has already been present for at least a predefined period of time,
  closing the return valve after the first predefined opening duration has elapsed.

This method ensures that the return valve is opened in a controlled manner only in the presence of both an overpressure in the line system and a low injection rate of urea solution, and at the same time at least one of the two states has been present for a predefined period of time. This ensures that the targeted dissipation of pressure by the return valve does not occur already in the event of brief pressure peaks in the case of a high injection rate of the urea solution, which would negatively influence the normal operation of the exhaust system.

The exhaust system may include a control unit which is connected in a communicating manner to the dosing valve, the pump, the return valve and the pressure sensor in order to carry out the method.

It is usually not possible to control the return valve simultaneously on the basis of the measurement data of the pressure sensor, because the pressure measurement during the rapid pressure drop when the return valve is open is not accurate and contemporaneous enough and would easily lead to an "overshoot" in the dissipation of pressure. Instead, predefined opening times are used. The first predefined opening duration may for example be 10 ms. The first predefined opening duration (and any second, third or fourth etc. predefined opening durations) may however also be predefined in a pressure-dependent manner. For example, in the presence of an overpressure of 1 bar (at an operating pressure of for example 5 bar), the first predefined opening duration may be 10 ms, and, in the presence of an overpressure of 1.5 bar, the first predefined opening duration may be 12 ms (only exemplary values).

The predefined period of time may for example be between 5 seconds and 60 seconds. In the case of a high injection rate of urea solution, it is commonly the case that multiple injections are performed in such a period of time.

The predefined injection limit may be exactly 0 ml per hour or may lie at a low finite value, for example 10 ml per hour.

The injection rate of urea solution may for example be determined in response to measured values of an exhaust-gas sensor arranged downstream of the SCR catalytic converter.

It is preferred if the return valve is, in a sequence after closing, opened at least a second time for a second predefined opening duration and then closed again. The pressure dissipation may then take place sequentially, wherein the number of opening processes and the opening durations of a sequence may be predefined. It is also possible for the selection of a sequence to be dependent on one of the determined states, for example on the pressure. A sequential opening of the return valve makes it easier to bring the pressure back to the operating pressure without overshooting the target value. If the pressure were reduced too far, this would unduly increase the power consumption of the pump, because this would consequently have to re-establish the operating pressure.

It is preferred if the return valve remains closed between every two opening processes for a closing duration of at least 250 ms. In this way, it may for example be ensured that an exact pressure measurement is present before a decision is made as to whether the return valve will be reopened. If necessary, it may be determined whether the pressure rises again, and possibly overshoots a further upper pressure limit, during this closing duration.

In a preferred embodiment, after a closure of the return valve, it is determined whether a predefined lower pressure limit has been undershot, and, if the lower pressure limit has not been undershot, the return valve is reopened for a further predefined opening duration. The return valve may for example be reopened if the pressure still lies above the operating pressure. It is also possible for the respective reopening of the return valve to be linked to an overshooting of a predefined second upper pressure limit, third upper pressure limit, fourth upper pressure limit etc. in each case after the previous closure of the return valve. If this further upper pressure limit is overshot for example within a provided closing duration between opening processes, then the return valve is reopened; if not, then the method is ended and the valve is reopened only in the case of the cumulative, enduring presence, according to the invention, of states a) and b).

It is preferred if at least one predefined opening duration is adapted if it is determined that, after the predefined opening duration has elapsed, the measured pressure lies outside a tolerance around an expected pressure. In this way, it is ensured that any incorrect calibrations in the method or changes in the opening behavior of the return valve are compensated for. The return valve may for example be a solenoid valve with a diaphragm, in which the diaphragm may slowly become worn, or the magnet force may change (for example owing to residual magnetism), over the course of time. For example, in the case of an upper pressure limit of 6 bar (1 bar above operating pressure) and a first opening duration of 10 ms, a resulting pressure of 5.2 bar±0.1 bar may be expected after the return valve is closed again. If a pressure of 5.4 bar is then determined, the first opening duration is increased. The predefined opening durations may for example be adjusted proportionally according to their deviation from the expected pressure drop, that is to say in the above example 10 ms×(6 bar−5.2 bar)/(6 bar−5.4 bar) =13.3 ms. However, other functional adaptations are also conceivable, for example only by a small fraction (for example 10%) of an adaptation resulting from a proportional adaptation (in the above example from 10 ms by 0.33 ms to 10.33 ms instead of 13.3 ms). Overcompensation may thus be avoided.

In one embodiment, the period of time is 5 seconds, preferably between 5 and 60 seconds. In this way, it is ensured that the overpressure is not a brief pressure peak that does not require a dissipation of pressure.

It is preferable if the first upper pressure limit is 120% of an operating pressure for the injection of the urea solution and/or if the first upper pressure limit lies 1 bar above the operating pressure. This ensures that a sufficiently high overpressure above the operating pressure is present before a dissipation of pressure occurs.

Furthermore, various further factors may influence the required amount of urea solution to be added, such as the pressure reduction and the time and length of the injection, for example the materials used, the vehicle or the engine configuration.

The above-stated object is also achieved by an exhaust system including
- a catalytic converter system,
- a urea solution tank,
- at least one dosing valve for injecting urea solution into the catalytic converter system,
- a line system which enables urea solution to flow from the urea solution tank to the dosing valve and back,
- a pump arranged between the urea solution tank and the dosing valve in the line system,
- a return valve arranged between the dosing valve and the urea solution tank in the line system, and
- a pressure sensor which is configured to measure the pressure in the line system,
- a control unit which is connected in a communicating manner to the dosing valve, the pump, the return valve and the pressure sensor, characterized in that the control unit is configured to carry out a method according to any of the preceding embodiments. Here, "connected in a communicating manner" refers to the control unit may for example receive data from the dosing valve, the pump, the return valve and the pressure sensor and transmit control commands to the dosing valve, the pump, the return valve and the pressure sensor.

The control unit may be arranged inside or outside the conveyor system.

The line system preferably includes lines composed of polyamide. Since pressure peaks above the operating pressure which last for long periods of time are avoided with the method according to the invention, it is not necessary to use robust, elastic and pressure-resistant urea lines (composed for example of ethylene propylene diene monomer) in the line system, but rather lines made of polyamide may be used, which facilitates production and reduces the costs of the system.

All of features disclosed with regard to the method are also described with regard to the exhaust system and vice versa.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The above-described characteristics, features of this invention and the manner in which they are achieved will become clearer and more distinctly comprehensible in conjunction with the following description of the exemplary embodiments, which will be discussed in more detail in conjunction with the drawings, in which.

DETAILED DESCRIPTION OF THE PREFERRED EMBODIMENTS

The following description of the preferred embodiment(s) is merely exemplary in nature and is in no way intended to limit the invention, its application, or uses.

Figure 1:
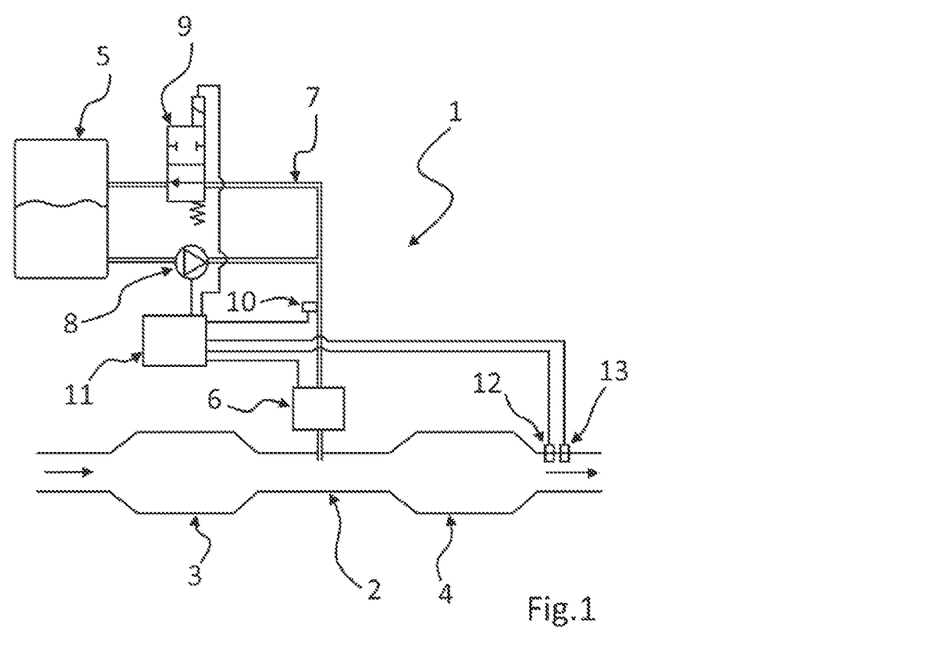
FIG. 1 shows a sketch of an embodiment of an exhaust system according to the invention.

FIG. 1 shows a sketch of an embodiment of an exhaust system 1 according to the invention. The exhaust system 1 includes a catalytic converter system 2, which in this case includes for example a diesel oxidation catalytic converter 3 and an SCR catalytic converter 4. The catalytic converter system 2 may however also include further components and/or other catalytic converter components.

The exhaust system 1 also includes a urea solution tank 5 for accommodating a supply of aqueous urea solution such as AUS32/Adblue©. A dosing valve 6 is provided for injecting urea solution into the catalytic converter system 2. The exhaust system 1 includes a line system 7 which enables urea solution to flow from the urea solution tank 5 to the dosing valve 6 and back. A pump 8 is arranged in the line system 7 between the urea solution tank 5 and the dosing valve 6 in order to supply urea solution at operating pressure (for example 5 bar) to the dosing valve 6.

A return valve 9 is arranged in the line system 7 between the dosing valve 6 and the urea solution tank 5. The return valve 9 is in this case a normally open solenoid valve.

The line system 7 is illustrated here only in one possible layout. The individual lines of the line system 7 may also run differently. For example, a feed line from the pump 8 to the dosing valve 6 may be separate from a return line from the dosing valve 6 to the return valve 9, and the urea solution flow occurs only through a prechamber of the dosing valve 6.

The exhaust system furthermore includes a pressure sensor 10 which is configured to measure the pressure in the line system 7. Furthermore, a control unit 11 is provided which is connected in a communicating manner to the dosing valve 6, the pump 8, the return valve 9 and the pressure sensor 10.

The control unit 11 is configured to carry out a method according to the invention. For this purpose, it may be equipped with appropriate control software. The control software may include machine learning algorithms. For example, a predefined opening duration may be adapted by a machine learning algorithm if it is determined that, after the predefined opening duration has elapsed, the measured pressure lies outside a tolerance around an expected pressure. In this way, it is ensured that any incorrect calibrations in the method or changes in the opening behavior of the return valve 9 are compensated for. The return valve 9 may for example be a solenoid valve with a diaphragm, in which the diaphragm may slowly become worn, or the magnet force may change (for example owing to residual magnetism), over the course of time. An adaptive adaptation of the predefined method parameters is therefore desirable.

The line system 7 may include lines made of relatively inexpensive polyamide, and does not necessarily require robust, elastic and pressure-resistant lines (such as, for example, lines made of ethylene propylene diene monomer). With the method according to the invention, pressure peaks above the operating pressure which last for long periods of time may be avoided, and thus the demands on the line material are reduced.

The exhaust system 1 also includes an exhaust-gas sensor 12, which measures the composition of the exhaust gases downstream of the SCR catalytic converter 4 in the exhaust-gas flow and determines the amount of nitrogen oxides. The injection rate of urea solution may thus be adapted to the exhaust-gas emissions in order to keep these as low as possible. The exhaust system 1 furthermore includes a temperature sensor 13 which measures the temperature of the exhaust gases, which may likewise be incorporated in the determination of the required injection rate of urea solution. The temperature sensor 13 may also be arranged at a different point in the catalytic converter system 2, and is in this case arranged downstream of the SCR catalytic converter 4 in the exhaust-gas flow merely by way of example.

Figure 2:
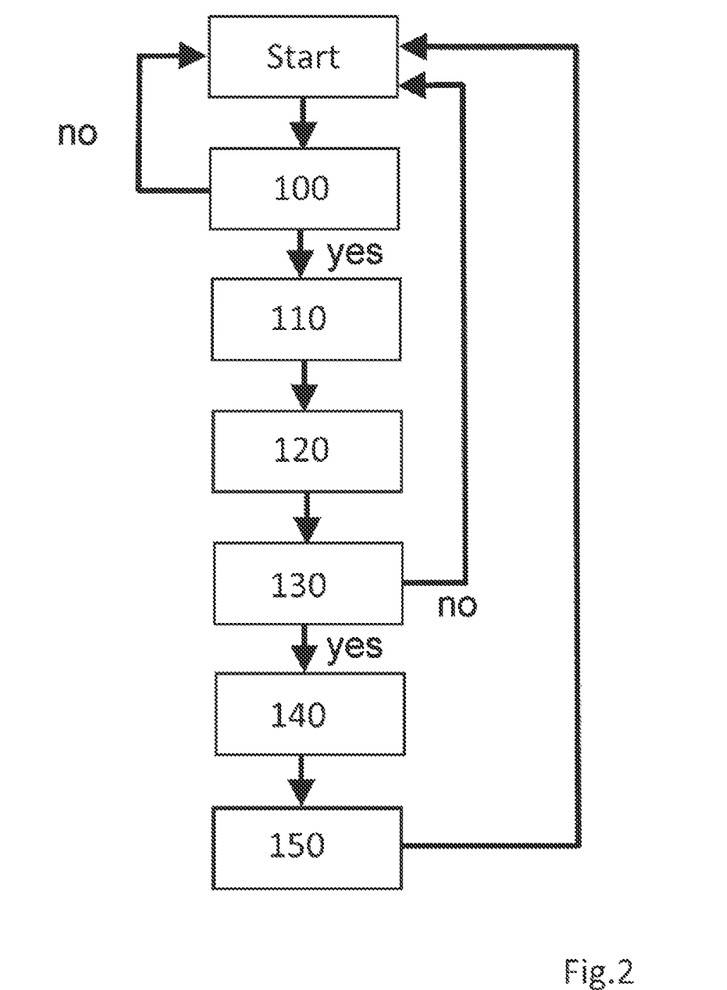
FIG. 2 shows a flow diagram of an embodiment of the method according to the invention.

FIG. 2 discloses a flow diagram of an embodiment of the method according to the invention. According to the invention, for the control of the exhaust system 1 described above, a method is provided which includes the following steps:

After the start, determining in step 100 whether one or more of the following states are present during the operation of the exhaust system 1:

a) an injection rate per unit of time of urea solution of the dosing valve 6 is less than or equal to a predefined injection limit, b) a pressure measured by the pressure sensor 10 in the line system 7 overshoots a predefined first upper pressure limit.

In step 110, the return valve 9 is opened for a first predefined opening duration if states a) and b) are present and at least one of the states has already been present for at least a predefined period of time. Otherwise, the return valve 9 remains closed and the method returns to the start. This may be referred to as pressure-based closed-loop control.

Following step 110, the return valve 9 is closed again in step 120 after the first predefined opening duration has elapsed.

In step 130, it is decided whether the return valve 9 will be reopened in the current opening sequence. This may be performed for example by virtue of the pressure sensor 10 determining whether the pressure overshoots a second upper pressure limit within a minimum closing duration (for example 250 ms) (for example a second upper pressure limit of 5.2 bar in the case of a first upper pressure limit of 6 bar). A series of descending upper pressure limits may be predefined for an opening sequence, whereby the overpressure is returned to the operating pressure gradually and in a controlled manner. A single opening step makes it much more difficult to attain the operating pressure as accurately as possible.

Alternatively, the decision as to whether the return valve 9 will be opened a further time may be made by whether the pressure has undershot the operating pressure or a tolerance limit above the operating pressure has been undershot.

The first predefined opening duration and any second, third, fourth etc. predefined opening durations may be predefined as a sequence. The lengths of the opening durations of an opening sequence may be in a descending order, for example 10 ms, 8 ms, 6 ms, 4 ms.

Individual predefined opening durations or entire sequences of opening durations may, in the decision with regard to a first opening of the return valve 9, be dependent on the start pressure. Depending on the temperature of the exhaust system, the pressure in the line system 7 may increase at different rates after a reduction in the injection rate and thus require pressure dissipation with different intensity. For example, in the presence of a relatively high overpressure at the beginning of the sequence, only the first opening duration may be relatively long, or all of the opening durations of the sequence may be relatively long (and vice versa in the case of a relatively low overpressure above the upper pressure limit). The tendency is for the major part of the overpressure to be dissipated in the first opening duration, which is why it may be sufficient for only the first opening duration to be made pressure-dependent.

Subsequently, in step 140, the return valve 9 is closed again in step 150 after the second predefined opening duration has elapsed. For the sake of clarity, the method ends here after two possible openings of the return valve 9 and starts again. The method may however include three, four, five or more openings of the return valve 9 in a sequence, wherein the number of opening processes actually carried out in a sequence, as described above, may be dependent on the pressure reached after each opening in the sequence.

Figure 3:
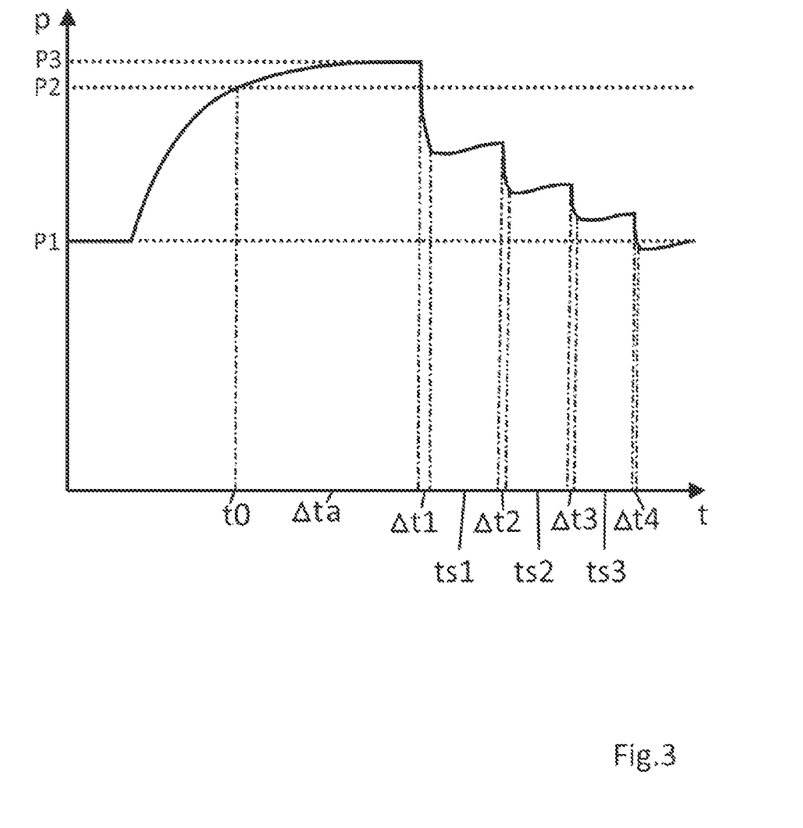
FIG. 3 is a schematic illustration of the pressure profile in the line system in an embodiment of the method according to the invention.

FIG. 3 shows a schematic illustration of the pressure profile in the line system 7 in an embodiment of the method according to the invention. Here, P1 denotes the operating pressure and P2 denotes the first upper pressure limit. As described in the introduction, in the event of a transition from a high injection rate to a low injection rate of urea solution, a pressure increase in the already pressurized urea solution in the line system 7 occurs owing to external heat from the exhaust system 1 (more specifically owing to the hot exhaust gases in the catalytic converter system 2). As a result, the pressure in the line system 7 increases until it overshoots the first upper pressure limit P2 at the time t0. If the pressure then remains above the first upper pressure limit for longer than the predefined period of time $\Delta ta$ (for example in the range of 5-60 seconds, depending on the embodiment of the exhaust system), and at the same time the injection rate remains below the injection limit, the return valve 9 is, according to the method, opened for a first opening duration $\Delta t1$ (for example 10 ms) when the period of time $\Delta ta$ elapses. When the first opening duration $\Delta t1$ elapses, the return valve 9 is closed again.

The pressure dissipation occurs here sequentially, wherein the number of opening processes and the opening durations may be predefined in a sequence. In this exemplary embodiment, the sequence includes four opening processes.

The return valve 9 remains closed between every two opening processes for a first, second and third closing duration ts1, ts2, ts3 (for example in each case at least 250 ms). In this way, it may for example be ensured that an exact pressure measurement is present before a decision is made as to whether the return valve will be reopened. At the same time, it is determined whether the pressure is increasing again.

In one embodiment, after each closure of the return valve 9, it is determined whether a predefined lower pressure limit (for example P1 or P1+$\Delta P$, where $\Delta P < 0.1$ bar) has been undershot. If the lower pressure limit has not been undershot, the return valve 9 is reopened for a further predefined opening duration $\Delta t2$, $\Delta t3$, $\Delta t4$. The return valve 9 may for example be reopened if the pressure still lies above the operating pressure P1. It is also possible for the respective reopening of the return valve 9 to be linked to an overshooting of a predefined second upper pressure limit, third upper pressure limit, fourth upper pressure limit etc. in each case after the previous closure of the return valve 9. If these further upper pressure limits are overshot for example within the closing duration ts1, ts2, ts3 between opening processes, then the return valve is reopened; if not, then the method is ended and the valve is reopened only in the case of the cumulative presence, according to the invention, of states a)+b) and the enduring presence of at least one of the states.

It is also possible for at least one predefined opening duration Δt1, Δt2, Δt3, Δt4 to be adapted if it is determined that, after the predefined opening duration Δt1, Δt2, Δt3, Δt4 has elapsed, the measured pressure lies outside a tolerance around an expected pressure. In this way, it is ensured that any incorrect calibrations in the method or changes in the opening behavior of the return valve 9 are compensated for.

The predefined opening durations Δt1, Δt2, Δt3, Δt4 may for example be dependent on an opening start pressure P3 in the line system when the period of time Δta elapses. The predefined opening durations Δt1, Δt2, Δt3, Δt4 etc. may be present in the form of a table or function which is dependent on the opening start pressure P3 and be correspondingly selected when the period of time Δta elapses.

Further upper pressure limits are not shown here for the sake of clarity, though these may be part of the method in order to determine whether or not further (second, third, fourth, etc.) openings of the return valve should be performed in the sequence of the method.

Although the invention has been illustrated and described in more detail by way of preferred exemplary embodiments, the invention is not restricted by the disclosed examples and other variations may be derived therefrom by a person skilled in the art without departing from the scope of protection of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for controlling a return valve of an exhaust system, comprising the steps of:
   providing a catalytic converter system;
   providing a urea solution tank;
   providing at least one dosing valve for injecting urea solution into the catalytic converter system;
   providing a line system which enables urea solution to flow from the urea solution tank to the dosing valve and back;
   providing a pump arranged between the urea solution tank and the dosing valve in the line system;
   providing a return valve arranged between the dosing valve and the urea solution tank in the line system; and
   providing a pressure sensor which is configured to measure the pressure in the line system;
   determining whether one or more of the following states are present during the operation of the exhaust system:
     a) an injection rate per unit of time of urea solution of the dosing valve is less than or equal to a predefined injection limit,
     b) a pressure measured by the pressure sensor in the line system overshoots a predefined first upper pressure limit,
   opening the return valve for at least one predefined opening duration (Δt1) if states a) and b) are present and at least one of the states has already been present for at least a predefined period of time (Δta);
   closing the return valve after the at least one predefined opening duration (Δt1) has elapsed;
   after the return valve is closed, opening the return valve at least one additional time for a second predefined opening duration (Δt2), where the second predefined opening duration (Δt2) is less than the at least one predefined opening duration (Δt1);
   closing the return valve after the return valve has been opened the at least one additional time.

2. The method of claim 1, further comprising the steps of prior to opening the return valve the at least one additional time, maintaining the return valve closed for a closing duration (ts1, ts2, ts3) of at least 250 ms.

3. The method of claim 1, further comprising the steps of:
   after the return valve is closed, determining whether a predefined lower pressure limit has been undershot;
   reopening the return valve for a further predefined opening duration (Δt2, Δt3, Δt4) if the lower pressure limit has not been undershot.

4. The method of claim 1, further comprising the steps of adapting the at least one predefined opening duration (Δt1, Δt2, Δt3, Δt4) if it is determined that, after at least one predefined opening duration (Δt1, Δt2, Δt3, Δt4) has elapsed, the measured pressure lies outside a tolerance around an expected pressure.

5. The method of claim 1, further comprising the steps of providing the predefined period of time (Δta) to be more than 5 seconds.

6. The method of claim 1, further comprising the steps of providing the predefined period of time (Δta) to be between 5 and 60 seconds.

7. The method of claim 1, further comprising the steps of providing the predefined first upper pressure limit (P2) to be 120% of an operating pressure for the injection of the urea solution.

8. The method of claim 1, further comprising the steps of providing that the predefined first upper pressure limit (P2) to be at least 1 bar above an operating pressure (P1).

9. An exhaust system comprising:
   a catalytic converter system;
   a urea solution tank;
   at least one dosing valve for injecting urea solution into the catalytic converter system;
   a line system which enables urea solution to flow from the urea solution tank to the dosing valve and back;
   a pump arranged between the urea solution tank and the dosing valve in the line system;
   a return valve arranged between the dosing valve and the urea solution tank in the line system;
   a pressure sensor which is configured to measure the pressure in the line system; and
   a control unit which is connected in a communicating manner to the dosing valve, the pump, the return valve and the pressure sensor;
   wherein the control unit determines whether at least one of the following states are present during the operation of the exhaust system:
     a) an injection rate per unit of time of urea solution of the dosing valve is less than or equal to a predefined injection limit,
     b) a pressure measured by the pressure sensor in the line system overshoots a predefined first upper pressure limit (P2);
   wherein the return valve is opened for at least one predefined opening duration (Δt1) if states a) and b) are present and at least one of the states has already been present for at least a predefined period of time (Δta);
   wherein after the return valve is closed, the return valve is opened at least one additional time for a second predefined opening duration (Δt2), and the second predefined opening duration (Δt2) is less than the at least one predefined opening duration (Δt1);
   wherein the return valve is closed after the return valve has been opened the at least one additional time.

10. The exhaust system of claim 9, wherein the return valve is closed after the at least one predefined opening duration ($\Delta t1$) has elapsed.

11. The exhaust system of claim 9, the line system further comprising lines composed of polyamide.

\* \* \* \* \*